United States Patent [19]
Monari

[11] Patent Number: 5,442,483
[45] Date of Patent: Aug. 15, 1995

[54] OPTICAL VIEWING INSTRUMENT FOR ATTACHMENT TO A GUNSIGHT EYEPIECE

[75] Inventor: Lawrence M. Monari, Palm Bay, Fla.

[73] Assignee: DBA Systems, Inc., Melbourne, Fla.

[21] Appl. No.: 123,076

[22] Filed: Sep. 17, 1993

[51] Int. Cl.⁶ .......................... G02B 6/00; G02B 27/14
[52] U.S. Cl. ...................................................... 359/638
[58] Field of Search ............... 359/618, 619, 637, 638, 359/639, 640

[56] References Cited

U.S. PATENT DOCUMENTS

| | | | |
|---|---|---|---|
| 3,734,627 | 5/1973 | Edwards | 356/153 |
| 4,255,013 | 3/1981 | Allen | 350/10 |
| 4,423,957 | 1/1984 | Poole | 356/153 |
| 4,732,438 | 3/1988 | Orbach et al. | 350/1.1 |
| 4,863,269 | 9/1989 | Ellis | 356/251 |
| 4,993,819 | 2/1991 | Moorhouse | 350/557 |

*Primary Examiner*—Akm E. Ullah
*Attorney, Agent, or Firm*—Pollock, Vande Sande & Priddy

[57] ABSTRACT

Optical device for coupling to an optical gunsight. A housing supports an optical assembly in line with the axis of the gunsight. The optical assembly includes an optical plate adjacent the gunsight exit pupil which is in contact with a beamsplitter. The beamsplitter includes first and second prisms having diagonal surfaces abutting one another and including a semi-reflective coating. An optical coating is placed on surfaces of the prisms adjacent the diagonal, to provide for a continuous light transmissivity through the beamsplitter optical plate combination. A relay lens is a located along a folded axis provided by the beamsplitter. The relay lens includes a prism for folding the folded axis a second time, so that the image is reinverted and reoriented right to left. A camera is coupled to the relay lens for monitoring the relayed image.

7 Claims, 3 Drawing Sheets

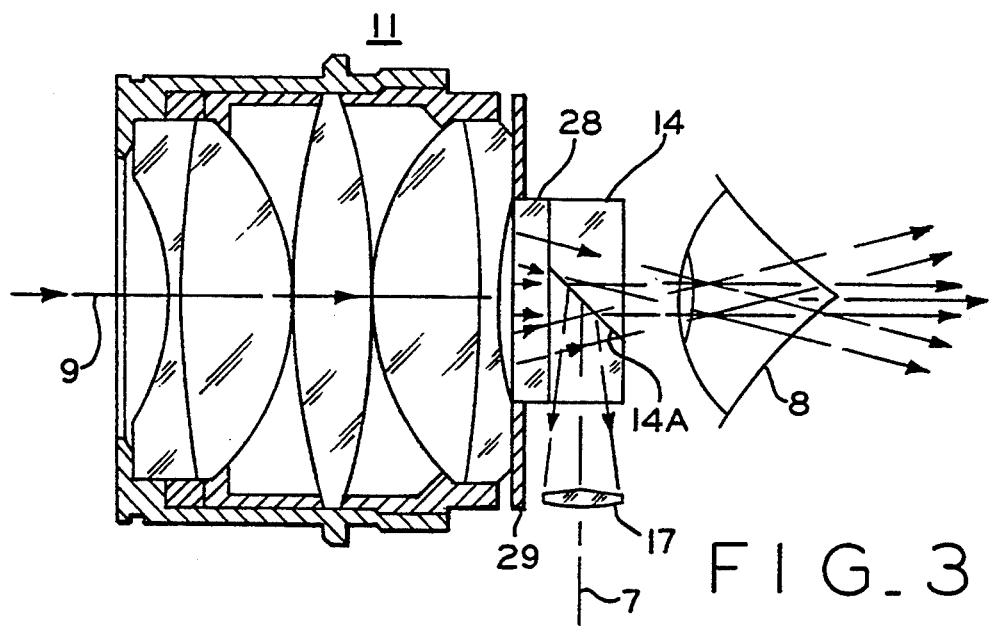
FIG_3
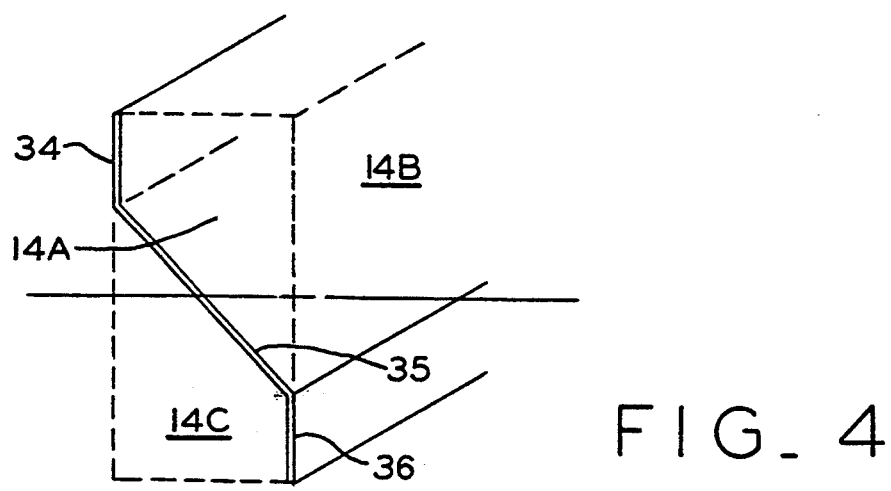
FIG_4
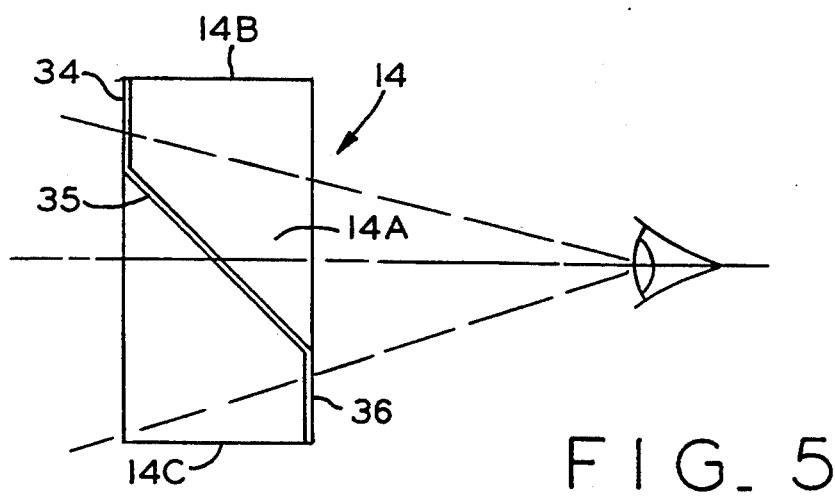
FIG_5

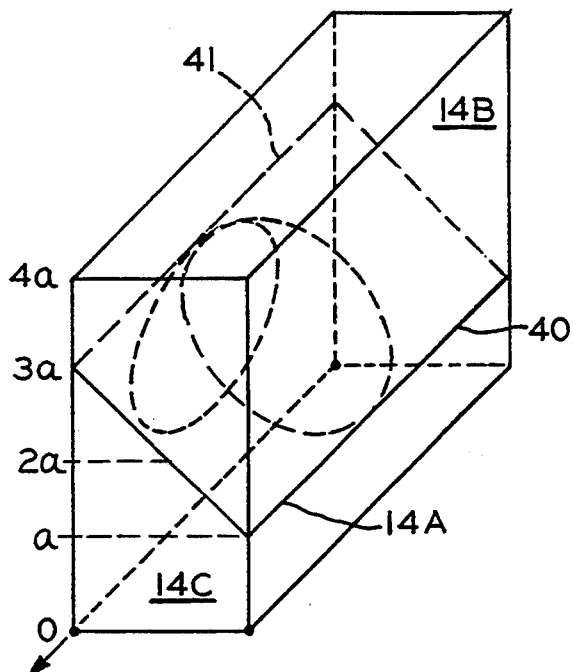
FIG_6
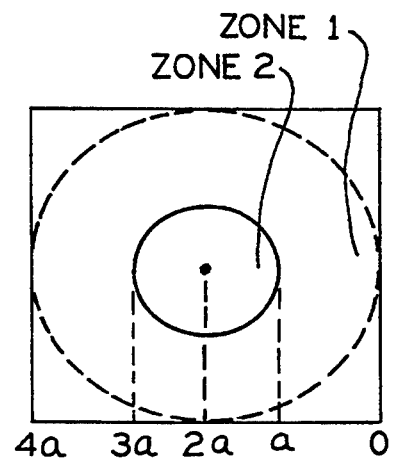
FIG_7
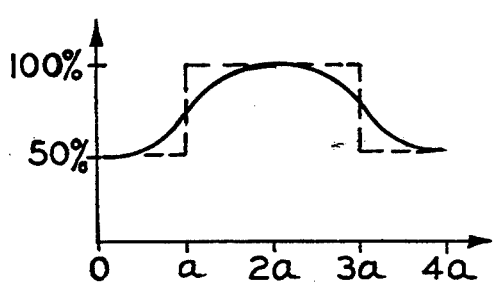
FIG_8
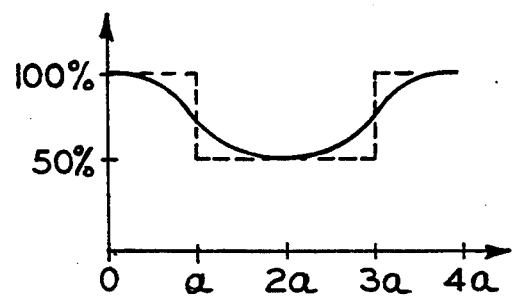
FIG_9
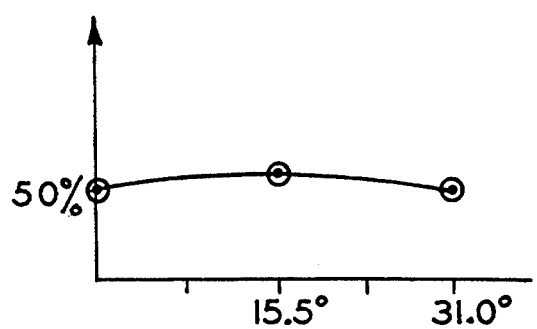
FIG_10

OPTICAL VIEWING INSTRUMENT FOR ATTACHMENT TO A GUNSIGHT EYEPIECE

RELATED APPLICATIONS

A related application to this subject matter has been filed, Ser. No. 08/048,002 now U.S. Pat. No. 5,365,375 to Monari.

BACKGROUND OF THE INVENTION

The present invention relates to devices for viewing images produced by optical gunsights. Specifically, an attachment for an optical gunsight is provided which will permit simultaneous viewing of a gunsight image produced from said gunsight through first and second optical ports.

Devices which attach to a gunsight for viewing an input scene, as well as permitting recording of the scene, are described in the foregoing referenced patent application, as well as in various prior art patents. U.S. Pat. No. 4,732,438 to Orbach et al., assigned to ELBIT Systems, Inc., as well as U.S. Pat. No. 4,993,819 to Moorehouse, describe devices which are directly coupled to the gunsight, and provide multiple ports for viewing the image produced by the gunsight.

The Orbach patent describes a prism structure which will permit split-image optical viewing of the gunsight image. A beamsplitter within the housing is coupled to the gunsight and directs a first image to an observer along the gunsight axis. A second image is produced at right angles to the gunsight axis which is imaged on a solid state image converter. The solid state image converter includes a focusing lens assembly which will permit the second image produced at right angles to the optical gunsight axis to be viewed via a television monitor, or alternatively recorded on video tape.

The foregoing design provides for advantages in maintaining eye relief at a minimum. The device described in U.S. Pat. No. 4,732,438 makes use of a pair of prisms joined together forming a diagonal surface for splitting the image into a direct viewing port, and through an orthogonal port connected to a solid state camera. The use of the prism introduces some artifacts into the viewed image, as well as reduces the field of vision obtainable from the optical gunsight.

The prism includes two prisms joined together along a diagonal surface, forming a semi-reflecting surface for splitting the image from the gunsight. The seams formed between the two prisms diagonal surfaces produce color and other visual artifacts which are seen by an observer using the device. Further, polarization effects occur such that the beamsplitter polarizes the incident image.

There is a reduction in the field of view as the diagonal surfaces only subtend a portion of the gunsight aperture.

Further, a visual dark transmission zone occurs in the center half of the visual field of view due to the reduced light from that portion of the aperture area subtended by common surface area of the two prisms.

In view of the foregoing problems, the present invention has been devised.

SUMMARY OF THE INVENTION

It is an object of this invention to provide an optical viewing apparatus which couples to an optical gunsight.

It is a more specific object of this invention to provide a device for optically splitting a gunsight image to produce two images, at least one of the images having a uniform image intensity over the entire field of view.

It is a further object of this invention to improve on prior art optical coupling devices which eliminate optical artifacts produced from the optical surfaces of a beamsplitter.

These and other objects of the invention are provided by an apparatus which directly couples to the eyepiece of an optical gunsight. A housing is provided having suitable clamps for connecting an optical assembly in alignment with the optical axis of a gunsight. The optical assembly is formed within the housing which includes an optical plate facing the gunsight eyepiece aperture. A beamsplitter comprising first and second prisms having diagonal surfaces abutting each other is located adjacent the optical plate. A portion of the optical aperture presented by the gunsight via the optical plate is opposite the diagonal surfaces of the first and second prism. An optical coating is applied to the hypotenuse surface of the abutting prisms, as well as on a portion of the prisms above and below the diagonal surfaces. The optical coating produces a uniform illumination across the aperture of each optical port. Further, the coating eliminates optical artifacts produced from the facing surfaces forming the beam splitting hypotenuse.

DESCRIPTION OF THE FIGURES

FIG. 3 is a section view of the optical gunsight and beamsplitter optics of the optical apparatus of FIG. 1.

FIG. 4 illustrates the structure of the prism of FIG. 3.

FIG. 5 illustrates the optical coating applied to the prism surfaces of FIG. 4.

FIG. 6 illustrates the aperture from the gunsight axis projected on the reflecting diagonal of the beamsplitter.

FIG. 7 is a front view of the optical aperture produced by the beamsplitter.

FIG. 8 illustrates the transmission loss of the uncoated optical surfaces of the beamsplitter.

FIG. 9 illustrates the transmission of the prism surfaces serving as a mask filter adjoining the reflecting diagonal surface.

FIG. 10 illustrates the composite light transmission characteristic along axis 9 for the full aperture of the prism of FIG. 6.

DESCRIPTION OF THE PREFERRED EMBODIMENT

Figure 2:
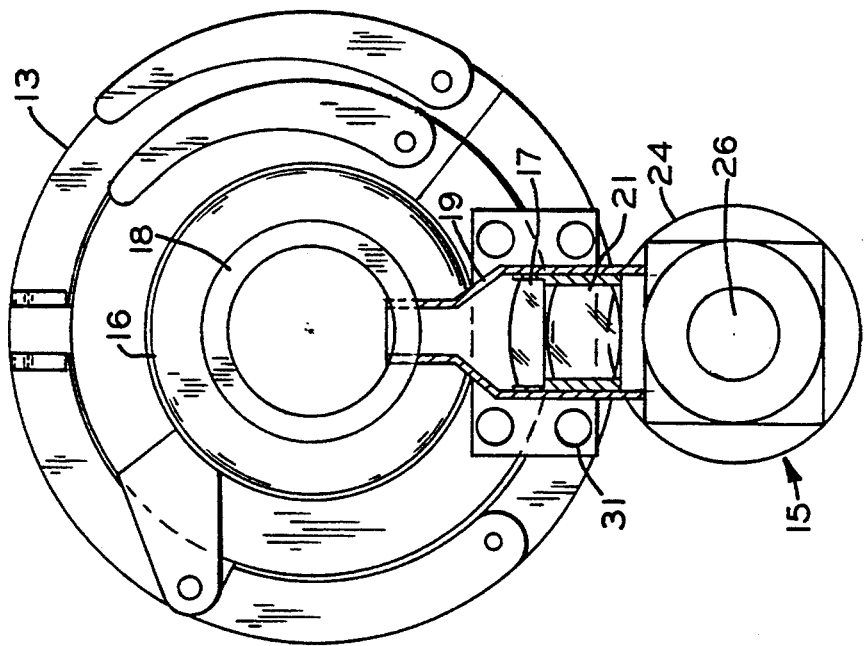
FIG. 2 illustrates a front view of the optical device of FIG. 1.
Figure 1:
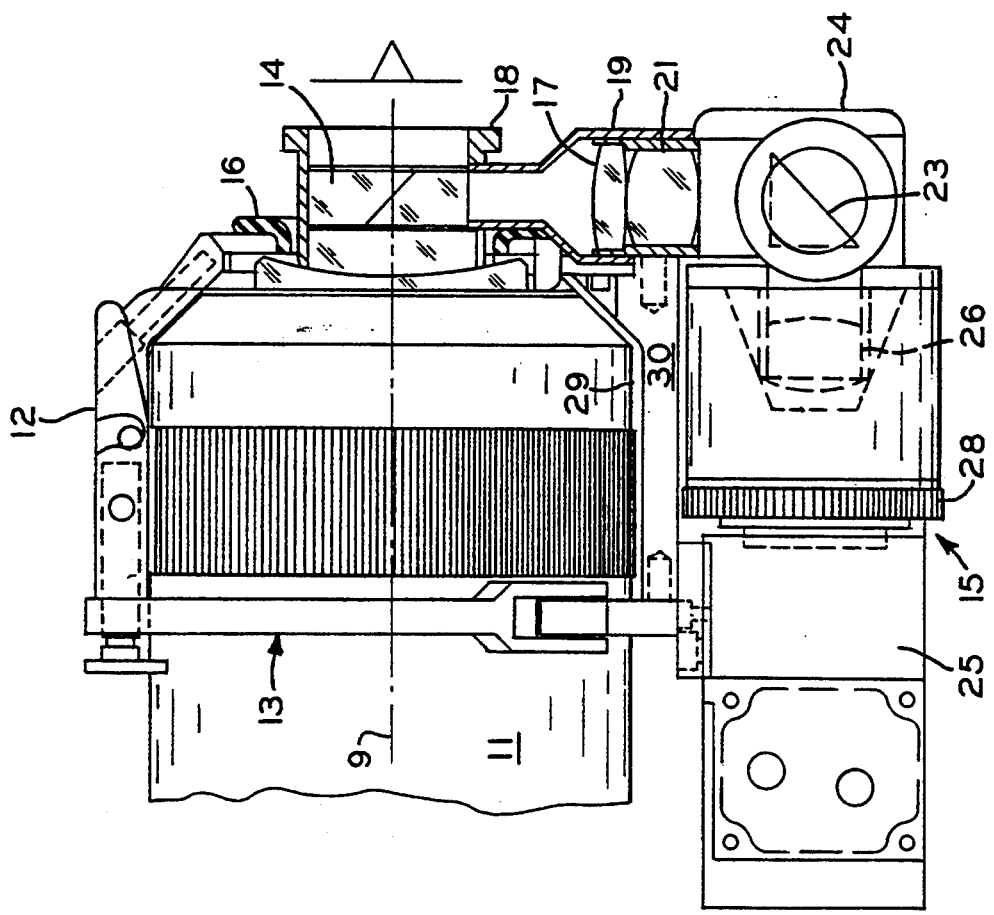
FIG. 1 is a side view of an optical apparatus in accordance with one embodiment of the invention clamped to an optical gunsight.

Referring now to FIGS. 1 and 2, there is shown an optical instrument in accordance with the present invention, connected to an optical gunsight 11. The device includes a clamping structure 12 which clamps an exterior housing 29 about the gunsight 11 viewing aperture. The exterior housing 12 supports an eyepiece section 18 in line with the optical axis 9 of the gunsight 11. The eyepiece 18 includes within it a beamsplitting prism 14 which provides for a portion of the gunsight image aperture to be folded 90° incident to a lens 17 which is the entrance pupil to a camera assembly. The prism 14 also permits direct viewing of the gunsight image by an observer with minimum reduction of eye relief.

The exterior housing 29 also supports a camera assembly 15, as well as a relay lens assembly 26. A circular clamping member 13 supports the camera assembly via a plate 30 and exterior housing 29.

The exterior housing 29 supports the eyepiece 18 against the last lens of the gunsight eyepiece. The eyecup 16 of the gunsight eyepiece provides for centering of the optical instrument eyepiece 18 when the clamp 12 is fixed in place.

The image from the beamsplitter 14 which is folded 90° enters the chamber 19 which supports the entrance pupil lens 17 of the relay lens assembly. Thus, images produced from the gunsight are transferred along the gunsight axis 9, as well as along the 90° folded axis to the relay lens assembly 24. The relay lens assembly 24 folds the image an additional 90° via a second prism 23. The second prism 23 does not split the image. Thus, the redirection of the image occurs without a loss in intensity.

A camera assembly 25 is shown, also supported by the circular clamp 13 and to the plate 30. The camera assembly 25 includes a control 28 for positioning the camera optical assembly with respect to the relay lens assembly 24.

The structure of FIGS. 1 and 2 permits monitoring and/or recording of a gunsight image. Further, a gunner may view the gunsight target image along the gunsight axis 9, and operate the weapon as usual during training. During training exercises, the image viewed by the camera assembly 15 will provide training instructors with a real time view of the gunners target during evaluation of the gunner's performance.

The foregoing embodiment maintains the eye relief, i.e., the distance between the gunner's eye and the surface of eyepiece 18, at a minimum. As in armored vehicles, tanks and other military emplacements, such eye relief is critical because of limitations on headroom.

The viewing advantages realized from the embodiment of FIGS. 1 and 2 are obtained by the beamsplitter shown in FIG. 3. Referring now to FIG. 3, there is shown the beamsplitter 14 which includes a diagonal surface 14a coated with a semi-reflective coating for splitting the image. The split image is observable along the axis 9 from an observer's position 8, as well as observable along a folded axis 7. An optical plate 28 is shown which is bonded to the beamsplitter 14. The optical plate 28 abuts the exit pupil 29 of the optical gunsight 11.

As will be evident from FIG. 3, the folded image along axis 7 represents only approximately 50% of the total aperture available from the optical gunsight 11.

The direct viewing along axis 9 permits nearly full aperture viewing of the gunsight 11 target image. As was noted with respect to the prior art, the directly viewed image may suffer from optical artifacts produced by virtue of the construction of prism 14, as well as a variation in image intensity due to the semi-reflective surface along diagonal surface 14a. These effects detract from the ability of the gunner 8 to perceive a true and accurate image from the gunsight 11.

FIGS. 4 and 5 illustrate how the prism 14a may be constructed such as to reduce the artifacts produced from the prism 14 as well as rendering the field of view along axis 9 of uniform intensity.

The semi-reflective diagonal surface 14a occurs by joining surfaces from complementary prisms 14b and 14c. The prism surfaces are treated with a semi-reflective coating so as to provide for the image folding along axis 7 and transmitting the image along axis 9. Approximately 50% of the gunsight pupil aperture coincides with an aperture presented by diagonal surface 14a of the beamsplitter. The remaining 25% of the gunsight aperture is incident to a surface area identified as 34 and 36 of FIG. 5. Since only the diagonal surface area 14a includes the semi-reflective surface 35, that portion of the gunsight image incident to surface 34 and 36 does not suffer 50% of the transmission loss to an observer along the gunsight axis 9. As FIGS. 6 and 7 show, the observer along axis 9 would see essentially two zones of transmissivity in the circular aperture of the gunsight. The central zone 2 shown in FIG. 7 lies between a and 3a representing the surface area subtended by the beamsplitter diagonal surface 14a. The region between 0 and a and 3a and 4a represent light transmitted through surfaces 34 and 36.

The avoidance of the two zones of FIG. 7 representing differences in light transmissivity can be corrected by applying an appropriate coating to surfaces 34 and 36.

FIGS. 8 and 9 represent the transmissivity of the coated surfaces 34, 36 as well as a coated surface 35 on the beamsplitter diagonal 14a. By coating each of the foregoing surfaces, a nearly uniformly illuminated pupil is obtained across the observer's field of view. The coating 35 on the diagonal surface 14a of beamsplitter 14 provides uniform light transmission, and surfaces 34 and 36 are coated so that light transmission from each of the surfaces 34 and 36 is substantially equal to the light transmission along axis 9 from the beamsplitter diagonal surface 14a. By terminating these coatings on the front and rear faces exactly at the seams shown for the beamsplitter's diagonal surface, the invention eliminates parallax. The three coatings are seen to merge evenly together as a single continuous coating. By matching the color and transmission of the coatings on the front and rear faces to the diagonal surface coating, the invention eliminates color and transmission variation across the entire visual FOV. By making the seam width smaller than 0.0005", the invention eliminates the two parallel black line artifacts that are seen by an observer using the ELBIT patent. This is accomplished by grinding and polishing the rear faces after the diagonal surface of each prism is cemented. By choosing the coatings carefully, the variation allowed in S & P polarization on the coating can be controlled and the invention eliminates the polarization problems in the prior art.

FIGS. 8 and 9 illustrate how the light transmission varies across the full face of the beamsplitter 14. FIG. 8 shows how, between 0 and a and 3a and 4a, the light transmission is held to substantially 50%, representing the surface areas coated by 34 and 36.

FIG. 9 illustrates that in the surface area subtended by the hypotenuse 14a, i.e., that surface area coated by 35, has a light transmission of approximately 50%.

The ideal transmission for each of the surfaces is shown in the broken lines, whereas in practice, the steep boundaries are not obtained, but rather the solid curve transmission characteristic of FIGS. 8 and 9 are realized.

By having complementary light transmission characteristics, a total overall exit pupil transmission of 50% is achieved, as is illustrated in FIG. 10. This maintains an essentially 31° full field of view for the exit pupil lying along the axis 9 for directly viewing the gunsight image.

The relay lens structure of FIG. 1 permits the camera to be moved rearwardly, thus providing for more room than the prior art devices which connected the camera along the folded axis. Further, as there are two folds provided by prisms 14 and 23, respectively, the camera image will be right side up and correctly oriented left to right. Thus, the necessity for any reverse scan camera circuits is avoided, since the image is presented in the correct orientation.

The blending of the transmissivity between surfaces covered by coating 34, 36 and 35 eliminates the different zones of FIG. 7, and also provides for a masking of the optical artifacts presented by the ends of the diagonal 40 and 41. The objectionable optical artifacts normally generated from the breaks in the optical surfaces can be removed through a combination of polishing and selection of the appropriate coating along adjoining optical surfaces.

Thus, there has been described an optical gunsight attachment which will permit viewing of a gunsight image through a second optical port. Those skilled in the art will recognize yet other embodiments of the invention, as defined by the claims which follow.

What is claimed is:

1. An optical device for providing a first and second viewing optical ports for an optical gunsight comprising:
   a housing having one end adapted for clamping to said gunsight, supporting an optical assembly in line with a viewing axis of said optical gunsight comprising:
   an optical plate facing said gunsight;
   a beamsplitter comprising:
   first and second prisms which are joined along complementary diagonal surfaces, said prisms having first and second opposite pairs of adjacent continuous surfaces subtended by said diagonal surface, said opposite pairs of surfaces forming an entrance and exit pupil, respectively, said entrance pupil abutting said optical plate so that a portion of an optical aperture of said optical plate is opposite said diagonal surfaces and remaining portions of said optical aperture are above and below said diagonal surfaces;
   an optical coating on said diagonal surfaces and on a portion of surfaces above and below said diagonal surfaces so that the same amount of light is transmitted through said above and below surfaces and said diagonal surfaces providing a full view of said gunsight device image;
   an eyepiece located opposite said beamsplitter diagonal surfaces in line with said axis for viewing an image produced by said gunsight device; and,
   a camera coupling device lying along an axis perpendicular to said gunsight axis for viewing an image reflected by said prisms diagonal surfaces.

2. The optical device of claim 1 wherein said camera coupling device has a smaller optical aperture than said eyepiece.

3. The optical device of claim 1 wherein said diagonal surfaces subtend a surface area of said optical plate, which is substantially 50% of said gunsight exit pupil aperture.

4. The optical device of claim 1 wherein said optical coating on said diagonal surfaces has an optical density which varies inversely as the distance from the center of said prism toward said continuous adjacent surfaces.

5. The optical device of claim 4 wherein said optical coating on said surfaces above and below said diagonal surfaces has an optical density which varies inversely as the distance away from said diagonal surface increases.

6. An optical device for providing first and second optical viewing ports for a gunsight comprising:
   a housing having one end for clamping to said gunsight supporting an optical assembly in alignment with said gunsight optical axis, said optical assembly comprising:
   first and second prisms abutting each other along a common diagonal surface, said prisms facing said gunsight so that said diagonal is intersected by said gunsight optical axis;
   an optical coating over said prisms abutting surfaces, forming a beamsplitter which transmits said image over said axis and reflects said image along an axis perpendicular to said gunsight axis;
   second optical coating over a surface of said first prism which faces said gunsight and is contiguous with one end of said abutting surfaces, and disposed over a surface of said second prism contiguous with a remaining end of said abutting surfaces, said second optical coating having a transmissivity which equalizes the illumination produced along said gunsight axis from a gunsight image incident to said contiguous surfaces and said abutting surfaces;
   a camera coupling port aligned along said perpendicular axis for receiving an image reflected by said abutting surfaces; and,
   an eyepiece located along said gunsight axis for viewing an image transmitted by said abutting surfaces.

7. The optical device of claim 6 wherein said camera coupling port is coupled by a relay lens to a video camera.

* * * * *